(12) United States Patent
Prasad et al.

(10) Patent No.: US 12,735,100 B2
(45) Date of Patent: Sep. 15, 2026

(54) STEERING KNUCKLE FOR INCREASING GROUND CLEARANCE OF A VEHICLE

(71) Applicants: Varun Prasad, Frisco, TX (US); Bobby Wayne Hale, Bastrop, TX (US)

(72) Inventors: Varun Prasad, Frisco, TX (US); Bobby Wayne Hale, Bastrop, TX (US)

( * ) Notice: Subject to any disclaimer, the term of this patent is extended or adjusted under 35 U.S.C. 154(b) by 0 days.

(21) Appl. No.: 19/056,625

(22) Filed: Feb. 18, 2025

(65) Prior Publication Data

US 2025/0187660 A1 Jun. 12, 2025

Related U.S. Application Data

(63) Continuation-in-part of application No. 18/474,025, filed on Sep. 25, 2023, now abandoned, which is a continuation-in-part of application No. 18/229,601, filed on Aug. 2, 2023, now abandoned.

(51) Int. Cl.
*B62D 7/18* (2006.01)
*B60G 7/00* (2006.01)

(52) U.S. Cl.
CPC ............... *B62D 7/18* (2013.01); *B60G 7/001* (2013.01)

(58) Field of Classification Search
CPC .... B62D 7/18; B60G 7/001; B60G 2204/419; B60G 3/20; B60G 2200/144; B60G 2206/50
See application file for complete search history.

(56) References Cited

U.S. PATENT DOCUMENTS 4,418,783 A * 12/1983 Teraoka ............... B60K 17/303 180/209
6,406,043 B1 6/2002 Balmer
6,419,250 B1 7/2002 Pollock et al.
11,130,378 B1 9/2021 Lambert
2003/0052467 A1* 3/2003 Allman .................. B62D 17/00 280/86.756
2012/0318588 A1 12/2012 Kroese
2016/0059652 A1 3/2016 Weifenbach

FOREIGN PATENT DOCUMENTS

WO WO2018015942 1/2018
WO WO-2018015942 A1 * 1/2018 ............... B62D 7/18

OTHER PUBLICATIONS

Peak Suspension; 17+ Colorado ZR2 Suspension Components, https://web.archive.org/web/20230327110111/https://www.peaksuspension.com/collections/17-colorado-zr2-suspension-components, p. 4/5 Peak—Upper Arm Spacer Kit, Mar. 23, 2023 (Year:2023).

* cited by examiner

*Primary Examiner* — Vivek D Koppikar
*Assistant Examiner* — Scott Lawrence Strickler
(74) *Attorney, Agent, or Firm* — Richard Eldredge; Leavitt Eldredge Law Firm

(57) ABSTRACT

A steering knuckle for increasing ground clearance of a vehicle is disclosed. The steering knuckle includes a vertical arm, an upper mount, a steering arm and a lower mount positioned at the vertical arm. The steering knuckle includes a hub positioned at the bottom of the vertical arm. The upper mount includes an upper control arm. The lower mount includes a lower control arm. The hub mounts outside of attachment points of the upper control arm and the lower control arm in order to keep the same distance between the upper mount and the lower mount, and the steering arm to maintain a factory geometry. The steering knuckle eliminates the stress on suspension components and avoids permanent modifications to the suspension components.

15 Claims, 6 Drawing Sheets

150
148
132
100
120

STEERING KNUCKLE FOR INCREASING GROUND CLEARANCE OF A VEHICLE

CROSS-REFERENCE TO RELATED APPLICATIONS

The present application is a continuation-in-part of U.S. application Ser. No. 18/474,025, filed Sep. 25, 2023; which is a continuation-in-part of U.S. application Ser. No. 18/229,601, filed Aug. 2, 2023 (now abandoned); all of which are incorporated herein in their entirety and referenced thereto.

BACKGROUND OF THE INVENTION

Field of the Invention

The present invention relates to steering apparatus in a vehicle, and in particular, relates to a steering knuckle for increasing ground clearance of a vehicle such as a large pickup truck.

Description of the Prior Art

It is known that a steering apparatus of a vehicle allows a driver to steer a vehicle in a desired direction. The steering apparatus includes a steering wheel, a steering shaft, a gear unit, and a link structure. The link structure includes a steering knuckle having a wheel hub that attaches to a suspension and the gear unit.

An example of a steering knuckle is shown in FIG. 1A, as known in prior art. FIG. 1B shows a top view and a perspective view respectively of a typical steering knuckle 10, as known in prior art. Steering knuckle 10 includes a body 12, and a vertical arm (not shown) extending upwards from body 12. The vertical arm presents a strut arm 16, a steering arm 18 and a tie rod arm 20. Further, steering knuckle 10 includes a hub mount 22 for a mounting assembly (not shown) to connect steering knuckle 10 to a vehicle (not shown). FIG. 2 shows an environment 50 in which the described steering knuckle 10 implements, in accordance with prior art. In other words, environment 50 shows an embodiment of the invention appropriate for a rear-wheel drive vehicle 52; that is, a vehicle in which the drivetrain's power does not need to be translated through to a hub assembly 56. As can be seen, steering knuckle 10 connects to a wheel 52. Further, steering knuckle 10 connects to a steering arm 54, a hub assembly 56 and a tie rod arm 58.

One example is disclosed in a U.S. Pat. No. 6,419,250, entitled "One-piece forged steering knuckle assembly" ("the '250 Patent"). The '250 Patent discloses a knuckle assembly for vehicles having a flanged body wherein the tie rod arm, hydraulic brake caliper bracket and, in some instances, the steering arm extend from the flanged body in a one-piece forged manner. There are enlarged bosses extending from the flanged body opposite the wheel spindle, the bosses having a bore which are axially aligned to receive a king pin. The flanged body, wheel spindle, tie rod arm and brake caliper bracket are all formed from a single steel billet as a one-piece heavy duty forging. Such a design eliminates the brake caliper/knuckle joint and the tie rod arm/knuckle joint, and thus, it results in savings in assembly time and weight.

Another example disclosed in a U.S. Pat. No. 6,406,043, entitled "Suspension and steering system for a vehicle" ("the '043 Patent"). The '043 Patent discloses a steering and suspension arrangement for agricultural vehicle including a horizontal axle transverse to the direction of movement with the ground wheel mounted at each end of the axle. The length of the axle can be adjusted by extending and retracting end portions of the axle relative to a centre section of the axle. Each end of the axle carries a wheel hub on a suspension arrangement defined by an upper plate, a lower plate, a first channel member attached to the lower plate and a second channel member attached to the upper plate with the channel members facing each other and connected by two parallel pivoting links. Between the plates is mounted a gas bag spring. The frame is divided into a front portion and a rear portion which are held against steering movement but can pivot, each relative to the other about a horizontal axis along the direction of travel to accommodate twisting beyond the limited suspension movement. The steering is effected by steering movements of the front wheels controlled by two separate cylinders which are arranged in a hydraulic circuit which automatically compensates for any fluid leakage to maintain the wheels aligned.

Yet another example disclosed in a PCT Publication No. WO2018015942, entitled "Vehicle wheel knuckle configuration" ("the '942 Publication"). The '942 Publication discloses a vehicle wheel knuckle and wheel knuckle assembly, connecting wheel hub with vehicle suspension. Wheel knuckle includes wheel hub mount at lower section, the wheel hub mount coupled with a wheel hub. Wheel knuckle includes lower pivot coupling apertures disposed above wheel hub mount, and upper pivot coupling apertures disposed above lower pivot coupling apertures. A lower control arm and upper control arm of the vehicle suspension are each coupled at one end with the vehicle chassis, and are each hingedly coupled at the other end with the wheel knuckle at lower apertures and upper apertures respectively, such that lower control arm is coupled above drive shaft of wheel hub, providing extended range of vertical movement of wheel hub and enhanced ground clearance of vehicle. Wheel knuckle may include a steering hub mount at an upper section, the steering hub mount rotatably couplable with a steering member of the vehicle.

Although the above discussed disclosures are useful, they still have problems and present incomplete solutions. For example, existing steering knuckles do not allow to increase the ground clearance of the vehicle. Even if a user wishes to increase the ground clearance, then the size of the vehicle has to be stretched vertically. This may increase the ground clearance, but the wheels still have to touch the ground, and the frame of the vehicle has to be raised. Doing so puts a lot of stress on steering system components as they are now pulled to a strange angle, and this will cause them to wear out faster.

In addition, manufacturers of agricultural machinery and heavy-duty vehicles produce lift kits to increase ground clearance. The lift kits use larger structs or coils within the factory suspension mounts, effectively lowering the lower control arm (LCA) and raising the vehicle's sprung mass. Although the lift kits are capable of lifting the suspension by about 4 inches, they often suffer from problems such as stiffer suspension, reduced ride quality and mechanical wear. Specifically, the lift kits suffer from premature failure of the upper ball joints due to excessive articulation beyond their intended range. In order to avoid the above problem, some manufacturers have redesigned the upper control arms (UCA) to reduce strain on the upper ball joints. However, this results in a different problem i.e., excessive stress on the constant velocity (CV) axles.

In order to mitigate the above problems, some manufacturers modify the lift kits by installing drop brackets to reposition a vehicle's transfer case. Further, support cross-members are used to mitigate alignment issues of the suspension. All of the above modifications are irreversible and complicates their maintenance and restoration of the vehicle to its factory setting.

Another approach to address the suspension's misalignment is to redesign the steering knuckle. Redesigning the steering knuckle adjusts suspension geometry, but reduces steering radius and causes uneven stance width. For example, '043 Patent may not work effectively at high speeds, due to lateral forces created while turning. As a result, '043 Patent cannot be used to replace stock parts and is not meant for retrofitting of suspension components.

Therefore, there is a need in the art to provide an improved steering knuckle designed for large vehicles to increase the ground clearance by several inches and eliminate the need for modifications to stock components.

SUMMARY OF THE INVENTION

It is an object of the present invention to provide a steering knuckle designed for large vehicles that avoids the drawback of known steering knuckles.

It is another object of the present invention to provide a steering knuckle designed for large vehicles to increase the ground clearance by several inches without compromising factory steering geometry or requiring extensive modifications to existing vehicle suspension components.

It is yet another object of the present invention to provide a steering knuckle that maintains position and angle of the constant velocity (CV) axles as per factory setting.

It is yet another object of the present invention to provide a steering knuckle that is designed to replace "stock" parts and can be retrofitted as an aftermarket replacement to modify ride height.

In order to achieve one or more objects, the present invention provides a steering knuckle for increasing ground clearance of a vehicle. The steering knuckle includes a vertical arm, an upper mount, a steering arm and a lower mount positioned at the vertical arm. The steering knuckle includes a hub positioned at the bottom of the vertical arm. The upper mount includes an upper control arm. The lower mount includes a lower control arm. The hub mounts outside of attachment points of the upper control arm and the lower control arm in order to keep the same distance between the upper mount and the lower mount, and the steering arm to maintain a factory geometry.

The hub is placed just below and outside of the lower control arm such that ⅓rd of a wheel is in line with a hub assembly and increases ground clearance of a vehicle. The steering knuckle includes vertical ribs to meet at the back of the hub at 45 degrees to create a point that distributes both vertical force and lateral force evenly between the upper control arm and the lower control arm as if the hub remained in its factory geometry.

The steering knuckle includes an access panel to provide access to the interior of the steering knuckle. The access panel includes a gear mechanism that transfers motion from a vehicle's constant velocity (CV) shaft to a vehicle's wheel. Further, the steering knuckle includes a power train unit that transfers power from internal mechanisms of the steering knuckle into a hub assembly through the use of a pinion and spider gears of the gear mechanism.

In one advantageous feature of the present invention, the steering knuckle is designed for lifted trucks, i.e., for large pickup trucks to which an after-market modification can be made to increase the ground clearance by several inches.

In another advantageous feature of the present invention, the steering knuckle can be used with a two-wheel-drive (2WD) vehicle, and/or a four-wheel-drive (4WD) vehicle, with gears or a chain to transfer motion from the vehicle's constant velocity (CV) shaft to the wheels.

These and other objects of the present invention will be apparent from review of the following specification and the accompanying drawings.

DETAILED DESCRIPTION OF THE PREFERRED EMBODIMENT

Figure 1A:
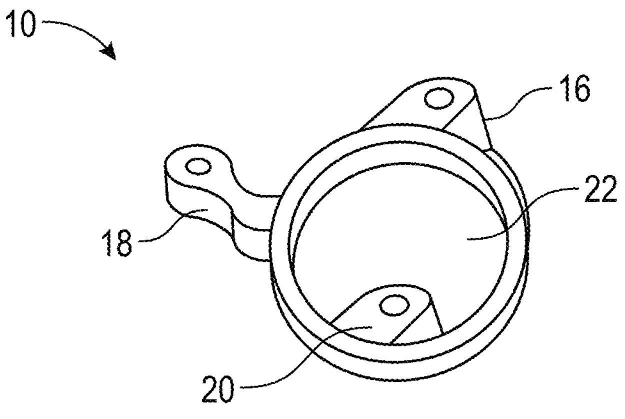
FIG. 1A and FIG. 1B illustrate a top and perspective view of a steering knuckle, respectively, in accordance with prior art.
Figure 1B:
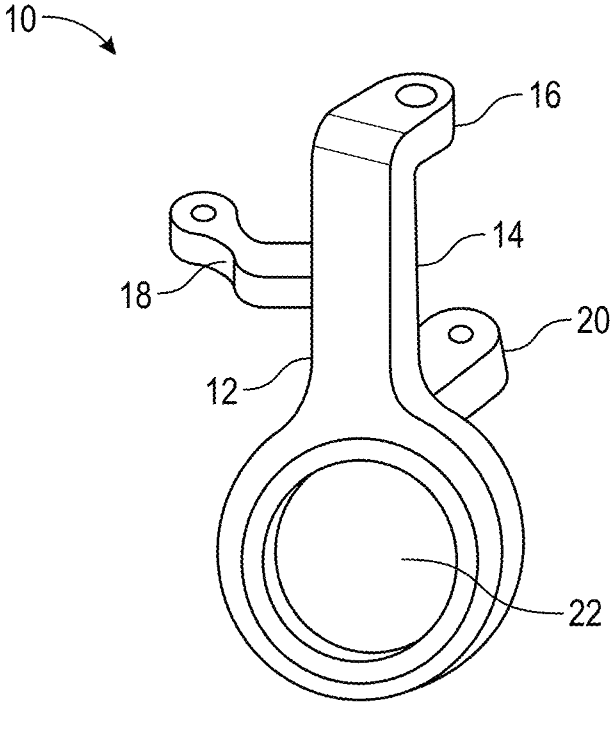
Figure 2:
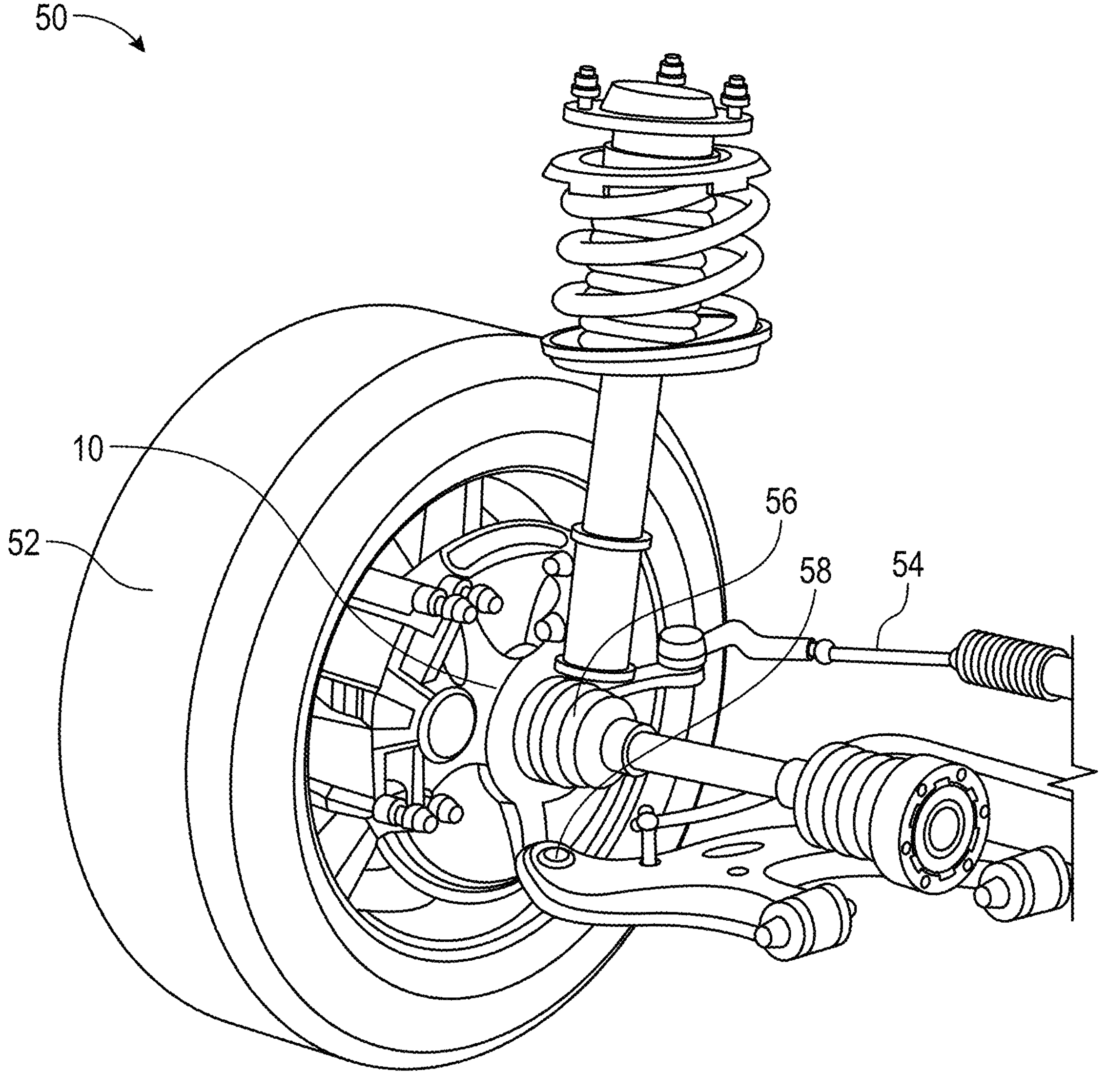
FIG. 2 illustrates the steering knuckle connected to a vehicle's wheel assembly, in accordance with the prior art.

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed steering knuckle. However, it will be apparent to those skilled in the art that the presently disclosed invention may be practiced without these specific details. In some instances, well-known structures and devices are shown in functional or conceptual diagram form in order to avoid obscuring the concepts of the presently disclosed steering knuckle.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a steering knuckle, it is to be further understood that numerous changes may arise in the details of the embodiments of the steering knuckle. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

The present invention discloses a steering knuckle for increasing ground clearance of a vehicle. The steering knuckle includes a vertical arm, an upper mount, a steering arm and a lower mount positioned at the vertical arm. The steering knuckle includes a hub positioned below the vertical arm. The upper mount includes an upper control arm. The lower mount includes a lower control arm. The hub mounts outside of attachment points of the upper control arm and the lower control arm in order to keep the same distance between the upper mount and the lower mount, and the steering arm to maintain a factory geometry. The hub is placed just below the lower control arm such that ⅓$^{rd}$ of a wheel is in line with a hub assembly and increases ground clearance of a vehicle.

Various features and embodiments of a steering knuckle for increasing ground clearance are explained in conjunction with the description of FIGURES (FIGS. 3-6).

Figure 3A:
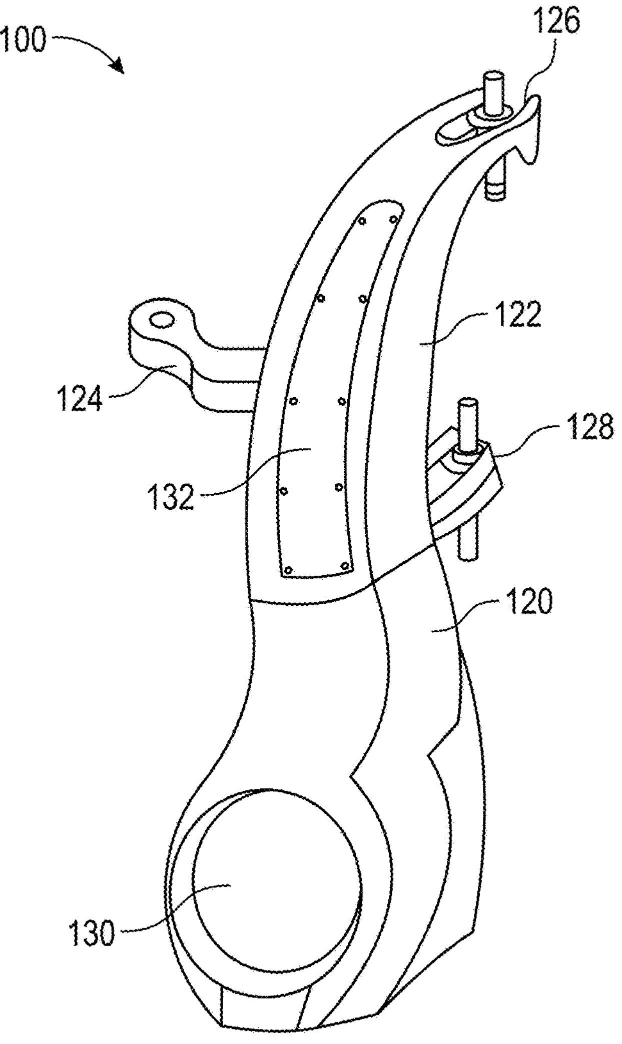
FIG. 3A and FIG. 3B illustrate a perspective view and a side view, respectively of a steering knuckle, in accordance with one embodiment of the present invention.
Figure 3B:
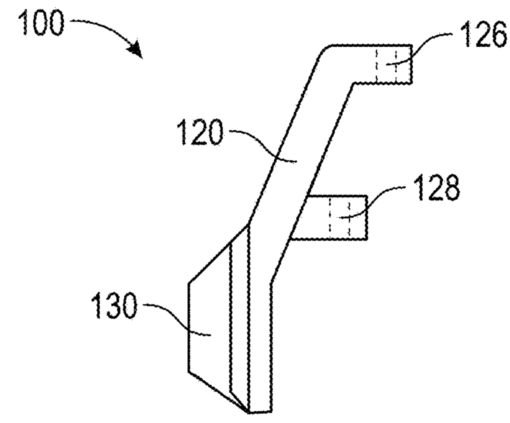
Figure 4:
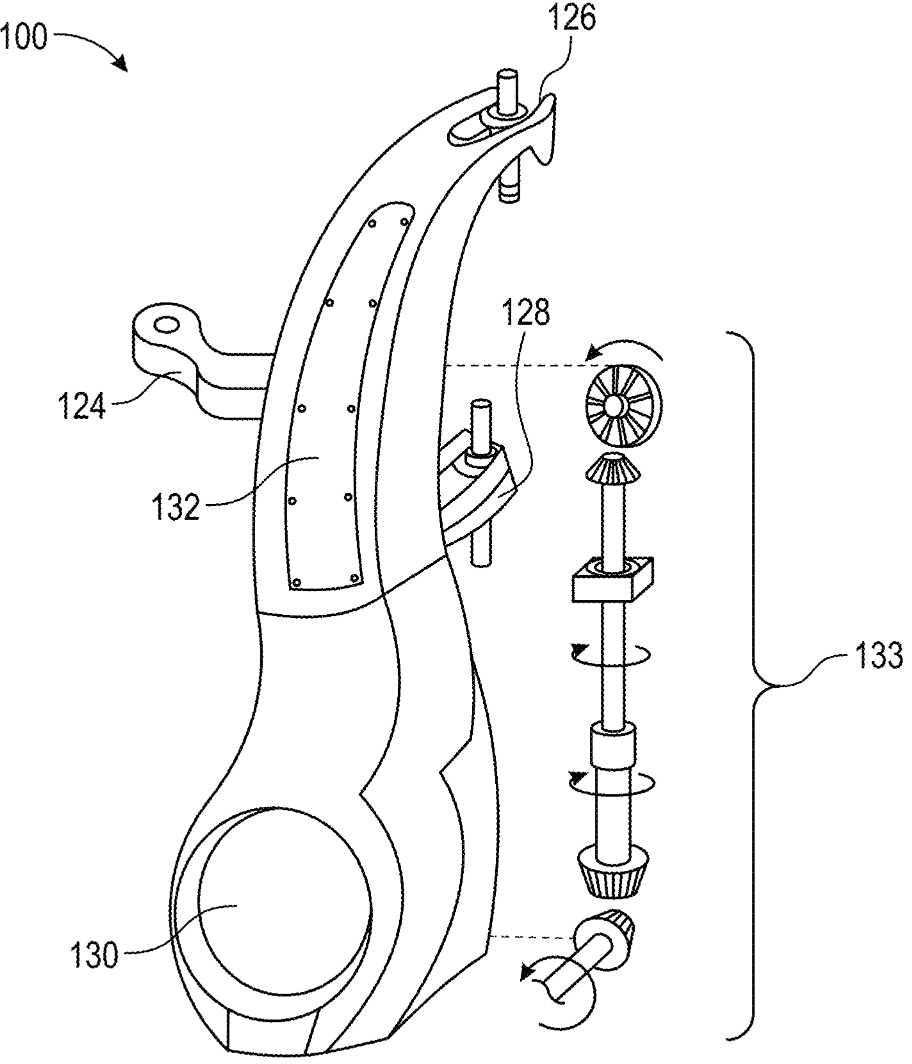
FIG. 4 illustrates the steering knuckle comprising a gear mechanism, in accordance with one embodiment of the present invention.

FIG. 3A and FIG. 3B show a perspective view and a side view, respectively of a steering knuckle 100, in accordance with one embodiment of the present invention. In accordance with the present invention, steering knuckle 100 installs in place of steering knuckle 10 of prior art. Steering knuckle 100 includes a body 120. Body 120 includes a vertical arm 122. Vertical arm 122 presents a steering arm 124, an upper mount 126, and a lower mount 128. Further, body 120 includes a hub 130 at the bottom. Further, body 120 includes an access panel 130. Access panel 130 indicates a door-like structure allowing or restricting access to a gear mechanism 133 stored within body 120. FIG. 4 shows an exploded view of gear mechanism 133 inside access panel 130.

Figure 5:
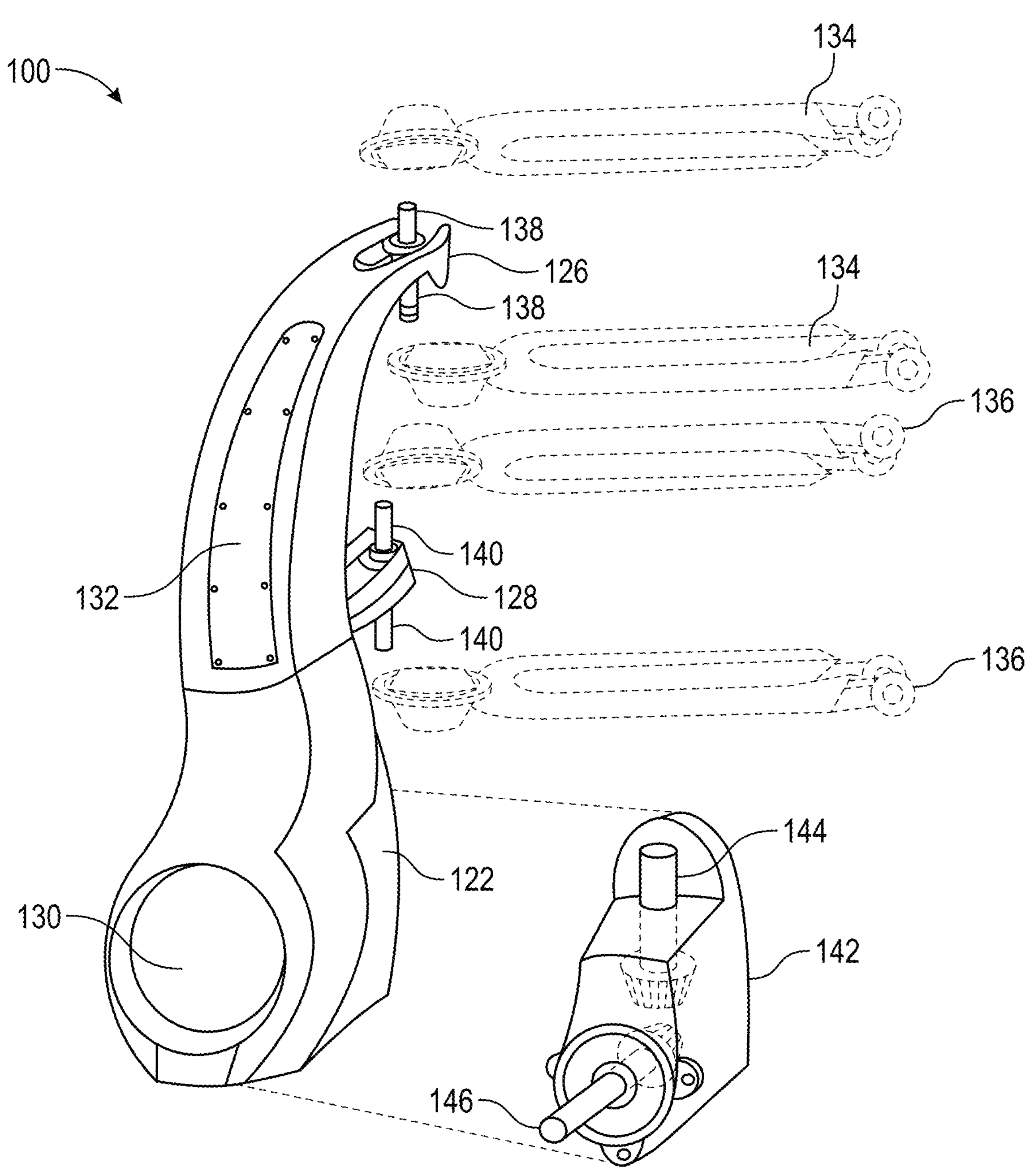
FIG. 5 illustrates the steering knuckle comprising a power train unit, in accordance with one embodiment of the present invention.

In accordance with the present invention, upper mount 126 presents an upper control arm (UCA) 134. Further, lower mount 128 presents a lower control arm (LCA) 136. UCA 134 allows connecting dual upper control mounts 138 at upper mount 126, as shown in FIG. 5. Further, LCA 136 connects dual lower control mounts 140 at lower mount 128.

Further, body 120 includes a power train unit (PTU) 142, as shown in FIG. 5. PTU 142 includes a casing that houses a first splined input shaft 144 and a second splined input shaft 146. First splined input shaft 144 connects to gear mechanism 133. Second splined input shaft 146 has a shape that matches with a factory hub setting and connects to hub 130. In the present invention, PTU 142 transfers power from internal mechanisms of knuckle into factory hub 130 through the use of a pinion and spider gears of gear mechanism 133 via solid axles (not shown), available in vehicles.

Figure 6:
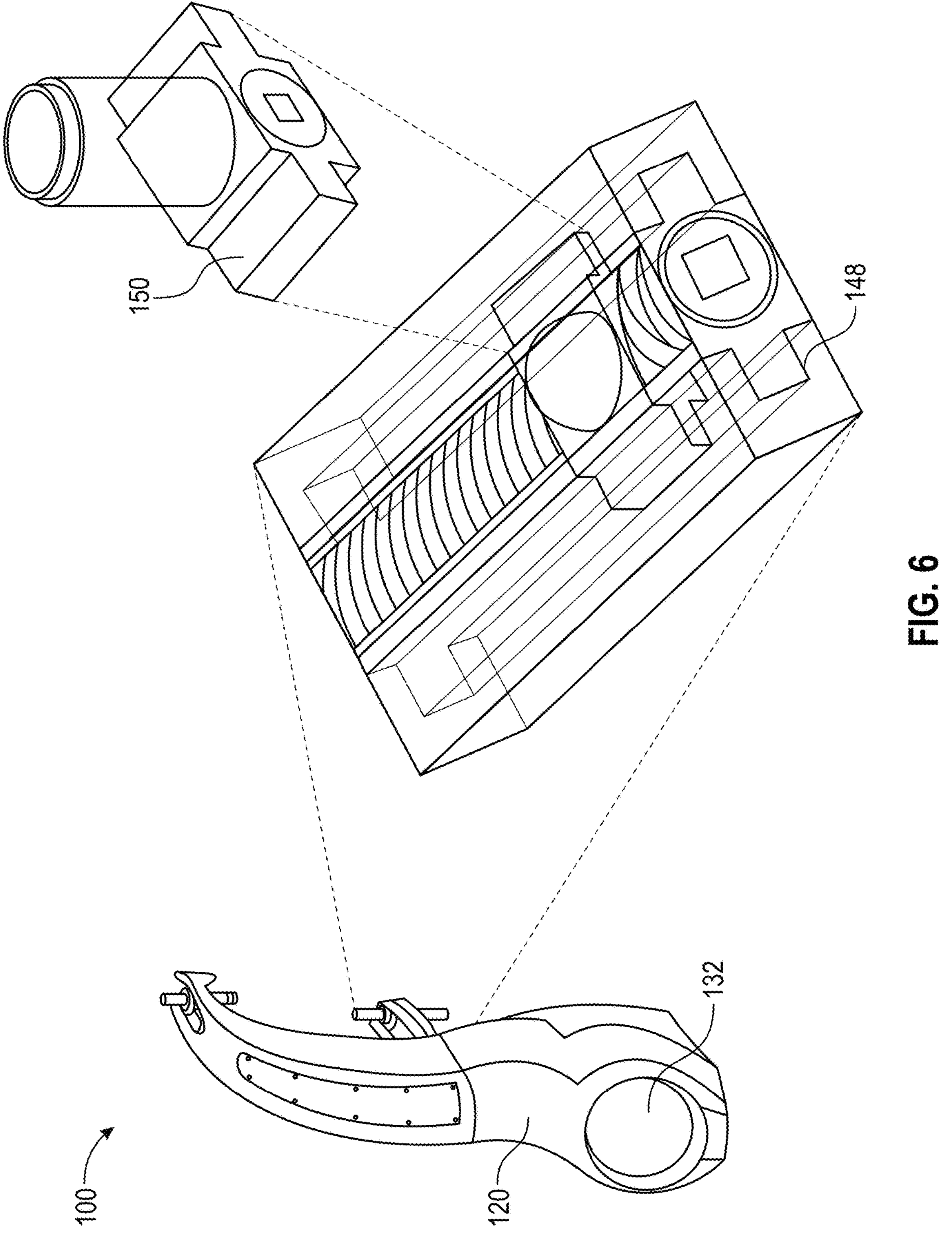
FIG. 6 illustrates the steering knuckle comprising a camber, in accordance with one embodiment of the present invention.

Additionally, each of upper mount 126 and lower mount 128 includes a camber or caster alignment adjustment member 148. FIG. 6 shows an enlarged view of camber 148, in accordance with one embodiment of the present invention. Caster 148 includes a connector 150. In one example, connector 150 includes a Heim joint, or spherical Heim bearing rod end, or a pivot connector. Camber 148 helps to adjust the alignment of both dual upper control mounts 138 at upper mount 126, and dual lower control mounts 140 at lower mount 128. In the present invention, placement of camber on the knuckle and at both upper mount 126 and lower mount 128 makes for a much greater range of camber and caster degrees. Further, camber 148 allows for better alignment for oversized wheel and tire combinations (not shown).

In the present invention, hub 130 is located outside of the attachment points i.e., UCA 134 and LCA 136 (upper and lower control arm ball joints). This allows the steering knuckle to keep the same distance between upper mount 126, and lower mount 128, and steering arm 124 to maintain factory geometry. When compared with the prior art, conventional designs place the hub at the center suspended between two fixed points. Further, the conventional lifted suspension designs move the control arms apart then enlarge the steering knuckle proportionally to fit the new space in order to maintain the alignment.

In accordance with the present invention, steering knuckle 100 can be mounted to a rear-wheel drive vehicle (two-wheel drive vehicle) and a four-wheel drive vehicle (all-wheel drive vehicle). In order to connect to a rear-wheel drive vehicle (two-wheel drive vehicle), at first, hub 130 is mapped from its factory/stock location centered between UCA 134 and LCA 136 to a final placement of just below LCA 136 such that ⅓$^{rd}$ of the overall wheel is in line with the lower ball joint. The final location of hub 130 is positioned out and away from the vehicle. Placing hub 130 out and down increases ground clearance and guarantees there is no contact with the caliper on LCA 136 when the knuckle turns right or left. Most manufacturers prevent this caliper contact by placing a "steer stop" on the knuckle, but such a technique causes a reduction in the steering radius.

The presently disclosed steering knuckle has several advantages over the prior art. The steering knuckle is designed for lifted trucks, i.e., for large pickup trucks to which an after-market modification can be made to increase the ground clearance by several inches. The presently disclosed steering knuckle helps to increase the ground clearance without altering the factory suspension geometry. The steering knuckle maintains the stock position of the vehicle's constant velocity (CV) shaft, which greatly helps to eliminate the problems typically associated with existing lift kits exceeding 4 inches. The stock position prevents premature wear of the CV axles, ball joints, and related suspension components.

The hub is placed below the lower control arm mount with one-third wheel alignment to the lower ball joint. This eliminates caliper contact issues without requiring a steering strap, and preserves the vehicle's full steering radius.

When compared with existing lift kits which require irreversible modifications, such as frame alterations and transfer case repositioning, the presently disclosed steering knuckle eliminates the permanent changes to the vehicle, and allows it to restore to factory configuration when ride height adjustment is not needed. Further, the caster alignment adjustment members at both upper and lower mounts enable proper alignment for oversized wheel and tire combinations.

The steering knuckle preserves the factory geometry and provides the desired distance in the truck lift, while not pulling the steering arms out of place. The steering knuckle can be used with a two-wheel-drive (2WD) vehicle, and/or a four-wheel-drive (4WD) vehicle, with gears or a chain to transfer motion from the vehicle's constant velocity (CV) shaft to the wheels.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A steering knuckle for a vehicle, said steering knuckle comprising:

a vertical arm;

an upper mount positioned at said vertical arm, wherein said upper mount comprises an upper control arm;

a steering arm positioned at said vertical arm;

a lower mount positioned at said vertical arm, wherein said lower mount comprises a lower control arm;

a hub positioned at the bottom of said vertical arm, and an access panel forming a removable enclosure configured to provide access to an interior of said steering knuckle;

wherein said access panel comprises a gear mechanism, and wherein said gear mechanism transfers motion from a vehicle's constant velocity (CV) shaft to a vehicle's wheel, wherein said gear mechanism is fully enclosed within said steering knuckle and comprises a gear train having at least one bevel gear set arranged to redirect rotational input from a transverse axis to a rotational axis of said hub;

wherein said upper control arm comprises dual upper control mounts, and wherein said lower control arm comprises dual lower control mounts, each spaced apart along said vertical arm;

wherein said hub mounts laterally outward and vertically below attachment points of said upper control arm and said lower control arm such that a center of said hub is positioned below a plane defined by said lower control arm, in order to keep the same distance between said upper mount and said lower mount, and said steering arm to maintain a factory geometry, and wherein said hub is offset downward relative to said lower control arm to increase ground clearance without altering angular orientation of said upper and lower control arms.

2. The steering knuckle of claim 1, further comprises vertical ribs integrally formed with said vertical arm and extending from said upper mount and said lower mount to a rear portion of said hub, said ribs being oriented at an inward angle between 30-60 degrees relative to a vertical axis to create a point that distributes both vertical force and lateral force evenly between said upper control arm and said lower control arm through a common load transfer node positioned rearward of said hub.

3. The steering knuckle of claim 1, further comprises a power train unit, wherein said power train unit transfers power from internal mechanisms of said steering knuckle into said hub, wherein said power train unit is housed within said vertical arm and is fixed relative to said steering arm.

4. The steering knuckle of claim 1, wherein said power train unit houses a first splined input shaft and a second splined input shaft, wherein said first splined input shaft connects to said gear mechanism, and wherein said second splined input shaft has a shape matching with a factory hub setting and connects to said hub, and wherein said first and second splined input shafts are aligned along non-collinear axes to accommodate vertical offset of said hub relative to said lower control arm.

5. The steering knuckle of claim 1, wherein each of said upper mount and said lower mount comprises a caster alignment adjustment member having a connector, and wherein said caster alignment adjustment members adjust the alignment of said dual upper control mounts at said upper mount, and said dual lower control mounts at said lower mount, respectively, wherein each said connector comprises an eccentric or offset interface configured to vary caster angle without relocating said vertical arm.

6. The steering knuckle of claim 1, wherein the placement of said hub eliminates interference with calipers and other suspension components, by positioning said hub below and outward of a brake caliper mounting envelope.

7. A steering knuckle for a vehicle, said steering knuckle comprising:

a vertical arm;

a steering arm positioned at said vertical arm;

an upper mount positioned at said vertical arm, wherein said upper mount comprises an upper control arm, and wherein said upper control arm comprises dual upper control mounts;

a lower mount positioned at said vertical arm, wherein said lower mount comprises a lower control arm, and wherein said lower control arm comprises dual lower control mounts; and a hub positioned at the bottom of said vertical arm, and an access panel forming a removable enclosure configured to provide access to an interior of said steering knuckle;

wherein said access panel comprises a gear mechanism, and wherein said gear mechanism transfers motion from a vehicle's constant velocity (CV) shaft to a vehicle's wheel, wherein said gear mechanism is fully enclosed within said steering knuckle and comprises a gear train having at least one bevel gear set arranged to redirect rotational input from a transverse axis to a rotational axis of said hub;

wherein said upper control arm comprises dual upper control mounts, and wherein said lower control arm comprises dual lower control mounts, each spaced apart along said vertical arm;

wherein each of said upper mount and said lower mount comprises a caster alignment adjustment member having a connector, and wherein said caster alignment adjustment members adjust the alignment of said dual upper control mounts at said upper mount, and said dual lower control mounts at said lower mount, respectively, and wherein said hub mounts laterally outward and vertically below attachment points of said upper control arm and said lower control arm in order to keep the same distance between said upper mount and said lower mount, and said steering arm to maintain a factory geometry, and wherein said hub is positioned below said lower control arm to increase ground clearance while maintaining parallel alignment of said upper and lower control arms.

8. The steering knuckle of claim 7, further comprises vertical ribs to meet at the back of said hub at 45 degrees to create a point that distributes both vertical force and lateral force evenly between said upper control arm and said lower control arm as if said hub remained in its factory geometry.

9. The steering knuckle of claim 7, further comprises a power train unit, wherein said power train unit transfers power from internal mechanisms of said steering knuckle into said hub.

10. The steering knuckle of claim 9, wherein said power train unit comprises a first splined input shaft and a second splined input shaft, wherein said first splined input shaft connects to said gear mechanism, and wherein said second splined input shaft has a shape matching with a factory hub setting and connects to said hub.

11. The steering knuckle of claim 7, wherein the placement of said hub eliminates interference with calipers and other suspension components.

12. A method of providing a steering knuckle for a vehicle, said method comprising the steps of:

providing a vertical arm;

providing an upper mount positioned at said vertical arm, said upper mount comprising an upper control arm;

providing a steering arm positioned at said vertical arm;

providing a lower mount positioned at said vertical arm, said lower mount comprising a lower control arm;

providing a hub positioned at the bottom of said vertical arm;

mounting said hub laterally outward and vertically below attachment points of said upper control arm and said lower control arm in order to keep the same distance between said upper mount and said lower mount, and said steering arm for maintaining a factory geometry, wherein said mounting step includes positioning said hub below a lower control arm plane to increase ground clearance without altering control arm angles; and providing an access panel forming a removable enclosure configured to provide access to an interior of said steering knuckle;

wherein said access panel comprises a gear mechanism, and wherein said gear mechanism transfers motion from a vehicle's constant velocity (CV) shaft to a vehicle's wheel, wherein said gear mechanism is fully enclosed within said steering knuckle and comprises a gear train having at least one bevel gear set arranged to redirect rotational input from a transverse axis to a rotational axis of said hub;

wherein said upper control arm comprises dual upper control mounts, and wherein said lower control arm comprises dual lower control mounts, each spaced apart along said vertical arm.

13. The method of claim 12, further comprising:

providing an access panel forming a removable enclosure configured to provide access to an interior of said steering knuckle; and transferring motion from a vehicle's constant velocity (CV) shaft to a vehicle's wheel via a gear mechanism, wherein said gear mechanism comprises an enclosed gear train including at least one bevel gear set configured to redirect rotational motion from a transverse axis to a rotational axis of said hub.

14. The method of claim 12, further comprising providing a power train unit for transferring power from internal mechanisms of said steering knuckle into said hub, wherein said power train unit is housed within said vertical arm and includes a first splined input shaft and a second splined input shaft arranged along non-collinear axes to accommodate vertical offset of said hub relative to said lower control arm.

15. The method of claim 12, further comprising:

providing dual upper control mounts and dual lower control mounts at said upper control arm and said lower control arm, respectively; and providing a caster alignment adjustment member at each of said upper mount and said lower mount for adjusting the alignment of said dual upper control mounts at said upper mount, and said dual lower control mounts at said lower mount, respectively, wherein each said caster alignment adjustment member comprises an eccentric or offset connector configured to vary caster angle without repositioning said vertical arm.

* * * * *